(12) United States Patent
Matsui et al.

(10) Patent No.: US 11,493,258 B2
(45) Date of Patent: Nov. 8, 2022

(54) AC ELECTRIC FIELD-ASSISTED REFRIGERATING CONTAINER

(71) Applicant: KYOWA KAKO CO., LTD., Tokyo (JP)

(72) Inventors: Saburo Matsui, Kyoto (JP); Masao Iizuka, Fukui (JP); Toshiyuki Kurachi, Tokyo (JP)

(73) Assignee: KYOWA KAKO CO. LTD, Tokyo (JP)

( * ) Notice: Subject to any disclaimer, the term of this patent is extended or adjusted under 35 U.S.C. 154(b) by 0 days.

(21) Appl. No.: 17/355,350

(22) Filed: Jun. 23, 2021

(65) Prior Publication Data
US 2022/0082306 A1  Mar. 17, 2022

(30) Foreign Application Priority Data

Sep. 17, 2020 (JP) .............................. JP2020-155923

(51) Int. Cl.
*F25D 17/04* (2006.01)
*A23B 7/152* (2006.01)
(Continued)

(52) U.S. Cl.
CPC ............ *F25D 17/042* (2013.01); *A23B 7/152* (2013.01); *F25D 23/006* (2013.01); *F25D 2317/0416* (2013.01)

(58) Field of Classification Search
CPC ........... F25D 17/042; F25D 2317/0416; A61L 2/202; A61L 9/015–037; A23B 7/152
See application file for complete search history.

(56) References Cited

U.S. PATENT DOCUMENTS 2,122,675 A * 7/1938 Baker .................. F25D 17/042
62/382
4,075,866 A * 2/1978 Williamitis ........... F25D 17/042
261/99
(Continued)

FOREIGN PATENT DOCUMENTS

JP    51-45100 A    4/1976
JP    2002-206852 A    7/2002
(Continued)

OTHER PUBLICATIONS

Simpson and TenWolde, Physical Properties and Moisture Relations of Wood, 1999, chapter 3 (Year: 1999).*
(Continued)

*Primary Examiner* — Christopher R Zerphey
(74) *Attorney, Agent, or Firm* — Renner, Kenner, Greive, Bobak, Taylor & Weber

(57) ABSTRACT

An AC electric field-assisted refrigerating container comprises: an outer container casing made of metal and having a storage chamber thereinside; an inner container casing formed of a dielectric panel and disposed inside the outer container casing; cooling means to cool an inside of the storage chamber; a plurality of insulated electrodes each formed by densely covering an entire circumference of an electrode plate with an insulator and disposed on an inner wall of the inner container casing; and a transformer for supplying an AC of 10 to 20 VA, at a voltage of 2000 to 4000 V and a frequency of 50 to 60 Hz, wherein the transformer has a ground terminal; wherein the refrigerating container is configured to cause AC discharge from the insulated electrodes to form an AC electric field inside the storage chamber, wherein, as a result of the AC discharge, electrons are supplied to the inner container casing formed of the dielectric panel, and then flow throughout the inner container casing, thereby allowing the electric field to be
(Continued)

uniformly distributed throughout the inside of the storage chamber, while being maintained in terms of intensity thereof and, wherein the dielectric panel is a woody panel.

11 Claims, 1 Drawing Sheet

(51) Int. Cl.
*F25B 23/00* (2006.01)
*F25D 23/00* (2006.01)

(56) References Cited

U.S. PATENT DOCUMENTS

| | | | | |
|---|---|---|---|---|
| 9,410,729 | B2* | 8/2016 | Kang | F25D 17/042 |
| 9,609,889 | B2* | 4/2017 | Miyashita | A23B 7/0425 |
| 10,143,763 | B2* | 12/2018 | Campalans | G07C 9/00896 |
| 2008/0056938 | A1* | 3/2008 | Han | A23L 3/32 |
| | | | | 422/22 |
| 2010/0072055 | A1* | 3/2010 | Tanaka | B01D 53/922 |
| | | | | 422/186.04 |
| 2010/0199861 | A1* | 8/2010 | Godai | A23B 4/012 |
| | | | | 99/483 |
| 2015/0143840 | A1* | 5/2015 | Ma | B60P 3/20 |
| | | | | 62/457.2 |

FOREIGN PATENT DOCUMENTS

| | | |
|---|---|---|
| JP | 2002-364968 A | 3/2007 |
| JP | 2007-075096 A | 3/2007 |
| JP | 2008-273622 A | 11/2008 |
| JP | 5682037 B2 | 3/2015 |
| JP | 6366882 A | 8/2018 |
| JP | 2019-97498 A | 6/2019 |

OTHER PUBLICATIONS

Notice of Rejection from JPO in priority application No. 2020-155923 dated Jan. 12, 2021 (with English translation attached).
Claim Amendments provided to JPO in priority application No. 2020-155923 dated Jan. 25, 2021 (with English translation attached).
Argument provided to JPO in priority application No. 2020-155923 dated Jan. 25, 2021 (with English translation attached).
Decision to Grant a Patent from JPO in priority application No. 2020-155923 dated Feb. 16, 2021 (with English translation attached).

* cited by examiner

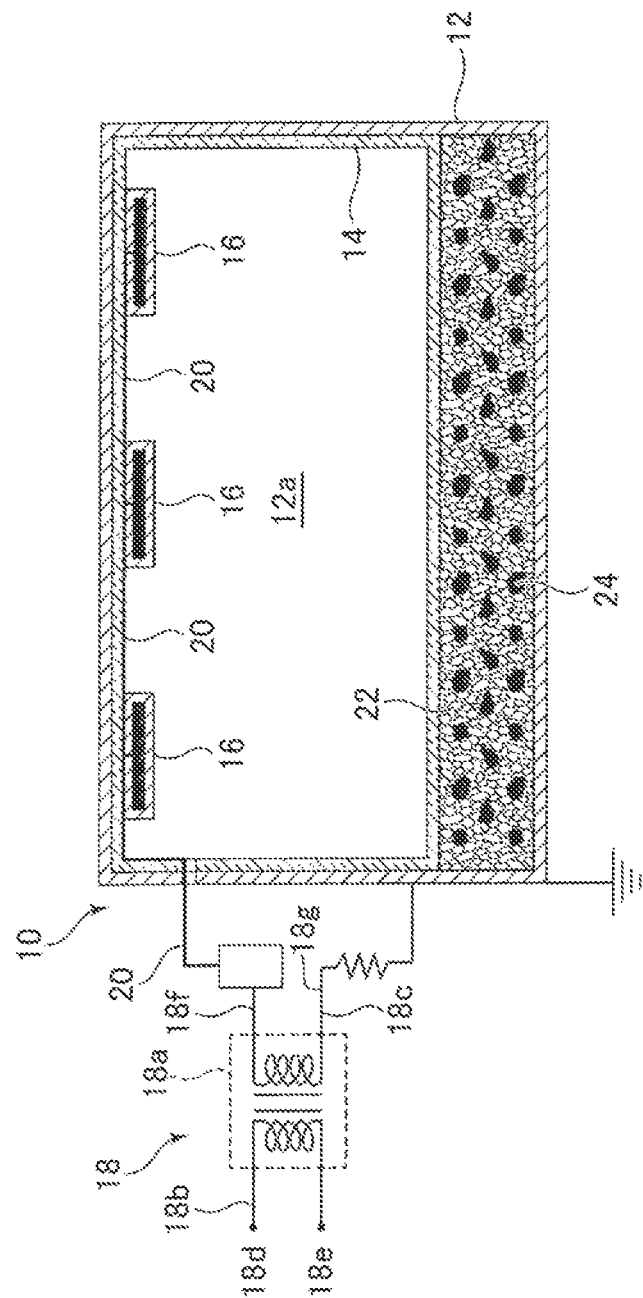

AC ELECTRIC FIELD-ASSISTED REFRIGERATING CONTAINER

TECHNICAL FIELD

The present invention related to an AC (alternate current) electric field-assisted refrigerating container, and more specifically to an AC electric field-assisted refrigerating container configured to generate an AC electric field in a storage space of fresh items such as fresh foods or fresh flowers to allow the storage space to serve as a freshness-keeping space, thereby achieving an improved freshness-keeping function.

BACKGROUND ART

With a view to keeping freshness of fresh items (perishable items) such as fresh vegetables inside a storage warehouse, JP 5682037B (Patent Document 1) proposes an electric field forming panel, and an electric field forming method for inducing supercooling.

The electric field forming panel proposed in the Patent Document 1 is characterized in that it has a panel-shaped panel body which comprises: a rectangular-shaped planar electrode comprised of a stainless net and formed in a 30 to 50-mesh net having flexibility; a surface layer member comprised of a flame-retardant canvas fabric which is non-reactive with water droplets or dew condensation water, wherein the surface layer member is formed to surround the planar electrode and partially formed in a laminate by thermal compression bonding to have a thickened part on an electric field formation side with respect to the electrode; and an insulating member comprised of high-density polyurethane having flexibility and disposed between the surface layer member and the electrode and on a side opposite to the electric field formation side, wherein the planar electrode has a size of up to 1 m×2 m, and is configured to, when a voltage of 1 kV to 5 kV is applied thereto in the form of a sinusoidal waveform having a frequency of 48 Hz to 62 Hz, form an electric field space having an electric field intensity of 0.3 kV/m to 15 kV/m, within 3 m from a surface of the electrode on the side on which the insulating member is not disposed, and wherein a surface of the panel body defined by a part of the surface layer member on the side on which the insulating member is disposed is detachably attached to a wall surface of an accommodation portion provided in a storage warehouse to accommodate therein an item to be stored, through insulating rivets provided in a peripheral edge portion of the panel body composed only of the surface layer member formed in a laminate by thermal compression bonding to have a thickened part, and wherein the electric field forming panel is configured to condition an internal environment of the accommodation portion to induce supercooling in which water is kept in a non-frozen state at a temperature equal to or less than a freezing point thereof.

Further, the electric field forming method proposed in the Patent Document 1 is characterized in that it comprises: using the above-mentioned electric field forming panel; and applying, to the electrode, a voltage of 1 kV to 5 kV in the form of a sinusoidal waveform having a frequency of 48 Hz to 62 Hz, to form an electric field space having an electric field intensity of 0.3 kV/m to 15 kV/m, within 3 m from the surface of the electrode on the side on which the insulating member is not disposed, thereby conditioning the environment of the electric field space to induce supercooling in which water is kept in a non-frozen state at a temperature equal to or less than a freezing point thereof.

It is true that, according to this proposed electric field forming panel, it can be expected that the electric field space as mentioned above is formed. However, in an example of application to a prefabricated refrigerating chamber or container having a large accommodation volume, shown in Example 2 of the Patent Document 1, the electric field forming panel is simply attached to the wall surface of the accommodation portion, so that no electric field is formed in the vicinity of the wall surface of the accommodation portion and in corners of a storage space inside the accommodation portion, or, even if an electric field is formed, it has an extremely low field intensity, and thus stored fresh items placed in the vicinity of the wall surface of the accommodation portion and in upper and lower corners of the storage space cannot receive the action of the electric field. Thus, it is likely to fail to accomplish freshness-keeping which is an original purpose.

This is because, in the electric field forming panel having the structure disclosed in the Patent Publication 1, only a current of about several VA can be supplied to the panel, in view of measures for preventing workers who work inside the refrigerating container from getting an electric shock.

From this point of view, for distributing an electric field to the vicinity of the inner wall and the corners of the inside of the refrigerating container at a sufficient and uniform intensity, using the electric field forming panel having the structure disclosed in the Patent Publication 1, a fairly good number of the panels would be needed.

CITATION LIST

Parent Document

Patent Document 1: JP 5682037B

SUMMARY OF INVENTION

Technical Problem

It is therefore an object of the present invention to provide an AC electric field-assisted refrigerating container capable of forming a good electric field even in the vicinity of a wall surface and in corners of a storage chamber, using less number of electric field generating electrodes, thereby, even if stored fresh items are placed in such locations, allowing the stored fresh items to sufficiently receive the action of the electric field and maintain freshness thereof.

Solution to Technical Problem

The above problem can be solved by AC electric field-assisted refrigerating containers having features in the following sections (1) to (10).

(1) An AC (alternating current) electric field-assisted refrigerating container comprising: an outer container casing made of metal and having a storage chamber thereinside; an inner container casing formed of a dielectric panel and disposed in close contact with an inner surface of the outer container casing; cooling means to cool an inside of the storage chamber; a plurality of insulated electrodes each formed by densely covering an entire circumference of an electrode plate with an insulator and disposed on the inner wall of the inner container casing; and a transformer for supplying an AC of 10 to 20 VA, at a voltage of 2000 to 4000 V and a frequency of 50 to 60 Hz, wherein the transformer has a ground terminal; wherein the refrigerating container is configured to cause AC discharge from the insulated electrodes to form an AC electric field inside the storage chamber, wherein, as a result of the AC discharge, electrons are supplied to the inner container casing formed of the dielectric panel, and then flow throughout the inner container casing, thereby allowing the electric field to be uniformly distributed throughout the inside of the storage chamber, while being maintained in terms of intensity thereof, and wherein the dielectric panel is a woody panel.

(2) The AC electric field-assisted refrigerating container as mentioned in the section (1), wherein the woody panel is formed of a solid wood.

(3) The AC electric field-assisted refrigerating container as mentioned in the section (1), wherein the woody panel is formed of plywood.

(4) The AC electric field-assisted refrigerating container as mentioned in any one of the sections (1) to (3), wherein the inner container casing has a rectangular parallelepiped box shape, and wherein at least a part of the insulated electrodes are arranged on a sidewall of the inner container casing.

(5) The AC electric field-assisted refrigerating container as mentioned in any one of the sections (1) to (4), wherein the inner container casing has a rectangular parallelepiped box shape, and wherein at least a part of the insulated electrodes are arranged on a ceiling of the inner container casing.

(6) The AC electric field-assisted refrigerating container as mentioned in any one of the sections (1) to (5), wherein the insulated electrodes are arranged side-by-side in parallel.

(7) The AC electric field-assisted refrigerating container as mentioned in any one of the sections (1) to (6), wherein a space is provided between a lower portion of the outer container casing and the inner container casing, wherein the space is filled with a moisture absorbing agent.

(8) The AC electric field-assisted refrigerating container as mentioned in the section (8), w % herein the moisture absorbing agent is a mixture of activated carbon and silica.

(9) The AC electric field-assisted refrigerating container as mentioned in any one of the sections (1) to (8), wherein the transformer is a multi-winding transformer.

(10) The AC electric field-assisted refrigerating container as mentioned in any one of the sections (1) to (9), which further comprises a voltage-resistant insulated cable formed by densely covering a conductor wire with an insulator and wired along an inner surface of the inner container casing, wherein the AC from the transformer is supplied to respective conductors of the insulated electrodes via the voltage-resistant insulated cable, wherein the voltage-resistant insulated cable is configured to cause AC discharge by itself.

Effect of Invention

In the AC electric field-assisted refrigerating container of the present invention, the inner container casing formed of the dielectric panel is provided inside the outer container casing, wherein, in response to an electrical discharge from each of the insulated electrodes, electrons flow through the dielectric panel, and thereby an AC electric field formed by the discharge is uniformly spread to every corner of the inside of the inner container casing.

This makes it possible to allow the AC electric field to spread to every corner of the inside of the inner container casing to bring out a freshness-keeping effect, by using less number of electrodes.

Generally, a fresh item to be stored is loaded into the container in a state in which it is put in a corrugated paperboard box. However, since this corrugated paperboard box is also a dielectric material, it acts in a manner similar to the inner container casing, when it is in contact with the inner container casing.

BRIEF DESCRIPTION OF DRAWINGS

FIG. 1 is a vertical sectional view of an AC electric field-assisted refrigerating container according to one embodiment of the present invention.

DESCRIPTION OF EMBODIMENTS

With reference to the accompanying drawing, an AC (alternating current) electric field-assisted refrigerating container 10 according to one embodiment of the present invention will now be described.

The AC electric field-assisted refrigerating container 10 comprises: an outer container casing 12 made of metal and having a storage chamber 12a thereinside; an inner container casing 14 formed of a dielectric panel and disposed inside the outer container casing 12; cooling means (not shown) to cool the inside of the storage chamber; a plurality of insulated electrodes 16 each formed by densely covering the entire circumference of an electrode plate with an insulator and disposed in close contact with an inner wall of the inner container casing; a transformer 18 for supplying an AC of 10 to 20 VA, at a voltage of 2000 to 4000 V and a frequency of 50 to 60 Hz, wherein the transformer has a ground terminal; and a voltage-resistant insulated cable 20 formed by densely covering a conductor wire with an insulator, and wired along the inner container casing to supply the AC from the transformer to the conductors of the insulated electrodes.

The cooling means may be constructed using any cooling device commonly used in container vehicles and container ships, and thus further detailed description will be omitted.

The following description will be made with regard to the above elements.

[Outer Container Casing 12]

The outer container casing 12 is a rectangular parallelepiped box-shaped casing which has heretofore been commonly used in container vehicles and container ships, wherein it is formed of a metal plate, and internally has a storage chamber 12a for accommodating therein an item to be stored and transported, such as fresh foods.

[Inner Container Casing 14]

The inner container casing 14 is composed of a dielectric panel disposed inside and along the outer container casing.

The inner container casing is preferably composed of a woody panel. This woody panel may be formed using wood containing water (the reason for this will be described later) and having a moisture absorbing property (the reason for this will be described later), such as plywood or, in some cases, A solid wood.

[Insulated Electrodes 16]

Each of the insulating electrodes 16 is configured to cause AC discharge, wherein it comprises a conductive plate, and an insulator layer entirely covering the circumference of the conductive plate. The conductive plate is composed of a metal plate capable of readily conducting electricity, such as a copper plate. However, any other material may also be used as long as it is a good conductor. Preferably, the area of the conductive plate is adjusted in conformity to the size of the storage chamber. Rubber, urethane resin or the like may be used as a material for the insulator layer.

The insulated electrode can be produced by placing the conductive plate in a mold, and injecting an insulator layer material such as urethane resin into the mold, to allow the conductive plate to be insert-molded in the insulator layer material. Alternatively, the insulated electrode can also be produced by laminating a pair of urethane resin plates, respectively, to opposite surfaces of the conductive plate, without leaving a gap therebetween. Preferably, the urethane resin constituting the insulator layer is subjected to vacuum defoaming to prevent gas bubbles from being left thereinside.

This is because, since the insulated electrode 16 is intended to cause AC discharge, the presence of gas bubbles can trigger breakage of the insulated electrode 16. The plurality of insulated electrodes 16 are closely attached to a ceiling panel and/or a sidewall panel of the inner container casing.

[Transformer 18]

Considering safety in the event of electrical breakdown, a multi-winding transformer having a ground terminal is used as the transformer 18 to supply an AC of 10 to 20 VA at a voltage of 2000 to 4000 V and a frequency of 50 to 60 Hz.

This transformer 18 comprises an iron core 18a around which a primary winding 18b and a secondary winding 18c are wound. The primary winding 18b has a pair of primary-side negative and positive terminals 18d. 18e, and similarly the secondary winding 18c has a pair of secondary-side negative and positive terminals 18f, 18g.

The insulated electrodes 16 are connected to the secondary-side negative terminal 18f, and the other terminal, i.e., the secondary-side positive terminal 18g, is connected to the outer container casing 12 via a resistor and is eventually grounded, as shown in FIG. 1.

[Cable 20]

The cable 20 is formed by densely covering a conductive wire with an insulator, and wired along the inner container casing 14 so as to supply the AC from the transformer 18 to respective conductors (conductive plates) of the insulated electrodes 16.

This cable may be composed of a cable meeting technical requirements defined in "the ministerial ordinance that establishes technical standards for electrical equipment (order of the Ministry of International Trade and Industry, No. 52, 1997)", w % herein any one of a blend of polyethylene, a blend of ethylene-propylene rubber, and a blend of butyl rubber may be used as the insulator.

The thickness of the insulator may be set in accordance with the ministerial ordinance. Specifically, in a case where a blend of polyethylene or a blend of ethylene-propylene rubber is used, the thickness may be set to 2.0 mm or more (2.0 mm in case of using a commercially available cable) when the working voltage is equal to or less than 3,500 V. or to 3.0 mm or more (3.0 mm in case of using a commercially available cable) when the working voltage is greater than 3,500 V. On the other hand, in a case where a blend of butyl rubber is used, the thickness may be set to 3.0 mm or more (3.0 mm in case of using a commercially available cable) when the working voltage is equal to or less than 3,500 V, or to 4.0 mm or more (4.0 mm in case of using a commercially available cable) when the working voltage is greater than 3.500 V.

According to an experiment conducted by the present inventors, using a voltage-resistant insulated cable comprising a 2 mm-thick insulator formed using a blend of polyethylene, at a working voltage of 3,000 V, it has been verified that this voltage-resistant insulated cable having a structure similar to the insulated electrode performs the action of a discharging electrode by itself.

A space 22 is provided between a bottom panel of the inner container casing 14 and a bottom panel of the outer container casing 12, wherein the space 22 is filled with a moisture absorbing agent 24. Moisture (including moisture vaporized from stored fresh items) in the storage chamber is absorbed by the inner container casing 14 formed of the woody panel, and the resulting water flows down through the woody panel or adheres to the surface of the woody panel and flow down along the surface of the woody panel. The moisture absorbing agent 24 is provided to supplementally absorb such water.

Preferably, the moisture absorbing agent 24 is a mixture of activated carbon and silica. This mixture has an excellent moisture absorbing property, and also acts as a gas absorbing agent for absorbing undesirable gas such as ethylene gas, which is generated in the storage chamber to hinder keeping freshness of stored fresh items such as fresh fruits.

The operation of the above-mentioned AC electric field-assisted refrigerating container 10 of the present invention will be described below.

When the transformer 18 supplies an AC of 10 to 20 VA at a voltage of 2000 to 4000 V and a frequency of 50 to 60 Hz to the insulated electrodes 16, each of the insulated electrodes 16 causes AC discharge (weak corona discharge) to form an AC electric field inside the storage chamber 12a.

In this process, the insulated electrodes 16 emit electrons, and a part of the emitted electrons are taken into the inner container casing 14 which is formed of the woody panel and to which the insulated electrodes are closely attached, and flow through the woody panel together with water contained in the woody panel. This flow of electrons occurs in each of a ceiling panel, four sidewall panels and a bottom (floor) panel of the inner container casing, and forms creeping discharge. This allows an AC electric field formed by the AC discharge from the isolated electrodes to be uniformly spread to every corner of the inside of the storage chamber, while being stably maintained in terms of intensity thereof.

Further, in a case where the cable is formed using a voltage-resistant insulated cable, the insulated cable itself performs the action of a discharging electrode to cause AC discharge. Thus, the above advantageous effect becomes stronger by appropriately setting a wiring location of the insulated cable.

Further, the insulated electrodes may be arranged on the dielectric panel side-by-side in parallel, as shown in the FIGURE. In this case, the effect of the voltage-resistant insulated cable and the effect of creeping discharge along the entire panel can be expected to synergize, and thus the discharge effect becomes much stronger.

LIST OF REFERENCE SIGNS

10: AC electric field-assisted refrigerating container
12: outer container casing
14: inner container casing
16: insulated electrode
18: transformer
20: cable
22: space
24: moisture absorbing agent

The invention claimed is:

1. An AC (alternating current) electric field-assisted refrigerating container comprising:
   an outer container casing made of metal;
   an inner container casing defining a storage chamber, said inner container casing having a box shape formed of a ceiling panel, sidewall panels and a bottom floor panel, wherein inner surfaces of the ceiling panel, the sidewall panels, and the bottom floor panel combine to surround an entire perimeter of said storage chamber, wherein each said ceiling panel, sidewall panels, and bottom floor panel are composed of a woody panel formed using wood containing water and having a moisture absorbing property, and wherein an inside of the storage chamber is maintained cool;

a plurality of electrically insulated electrodes, each formed by densely covering an entire circumference of an electrode plate with an electrical insulator and disposed in close face-to-face contact with said inner surfaces of said ceiling panel, said sidewall panels, and/or said bottom floor panel of the inner container casing to emit electrons, and wherein a part of the emitted electrons is taken into the inside of the woody panels of said ceiling panel, sidewall panels, and bottom floor panel and flows through the woody panels of said ceiling panel, sidewall panels, and bottom floor panel by the action of the water contained in the woody panels of said ceiling panel, sidewall panels, and bottom floor panel so that a flow of electrons occurs in the ceiling panel, the sidewall panels, and the bottom floor panel of the inner container casing, and wherein said flow of electrons forms a creeping discharge along an entirety of said inner surfaces of each of said ceiling panel, sidewall panels, and bottom floor panel so as to allow an AC electric field formed by an AC discharge from the woody panels of said ceiling panel, sidewall panels, and bottom floor panel to be uniformly spread in terms of intensity thereof to every corner of the inside of the storage chamber; and a transformer with a ground terminal for supplying an AC of 10 to 20 VA, at a voltage of 2000 to 4000 V and a frequency of 50 to 60 Hz to the electrodes.

2. The AC electric field-assisted refrigerating container as recited in claim 1, wherein the woody panels of the ceiling panel, the sidewall panels, and the bottom floor panel are formed of a solid wood.

3. The AC electric field-assisted refrigerating container as recited in claim 1, wherein the woody panels of the ceiling panel, the sidewall panels, and the bottom floor panel are formed of plywood.

4. The AC electric field-assisted refrigerating container as recited in claim 1, wherein at least a part of the insulated electrodes is arranged on at least one of the sidewall panels of the inner container casing.

5. The AC electric field-assisted refrigerating container as recited in claim 1, wherein at least a part of the insulated electrodes is arranged on the ceiling panel of the inner container casing.

6. The AC electric field-assisted refrigerating container as recited claim 1, wherein the insulated electrodes are arranged side-by-side in parallel.

7. The AC electric field-assisted refrigerating container as recited in claim 1, wherein a space is provided between a lower portion of the outer container casing and the inner container casing, the space being filled with a moisture absorbing agent.

8. The AC electric field-assisted refrigerating container as recited in claim 7, wherein the moisture absorbing agent is a mixture of activated carbon and silica.

9. The AC electric field-assisted refrigerating container as recited in claim 1, wherein the transformer is a multi-winding transformer.

10. The AC electric field-assisted refrigerating container as recited in claim 1, which further comprises a voltage-resistant insulated cable formed by densely covering a conductor wire with an insulator and wired along an inner surface of the inner container casing, wherein the AC from the transformer is supplied to respective conductors of the insulated electrodes via the voltage-resistant insulated cable, wherein the voltage-resistant insulated cable is configured to cause AC discharge by itself.

11. The AC electric field-assisted refrigerating container as recited in claim 7, wherein the inner container casing has a rectangular parallelepiped box shape.

* * * * *